R. SCHERL.
SINGLE TRACK VEHICLE.
APPLICATION FILED JUNE 19, 1908.
959,077.
Patented May 24, 1910.
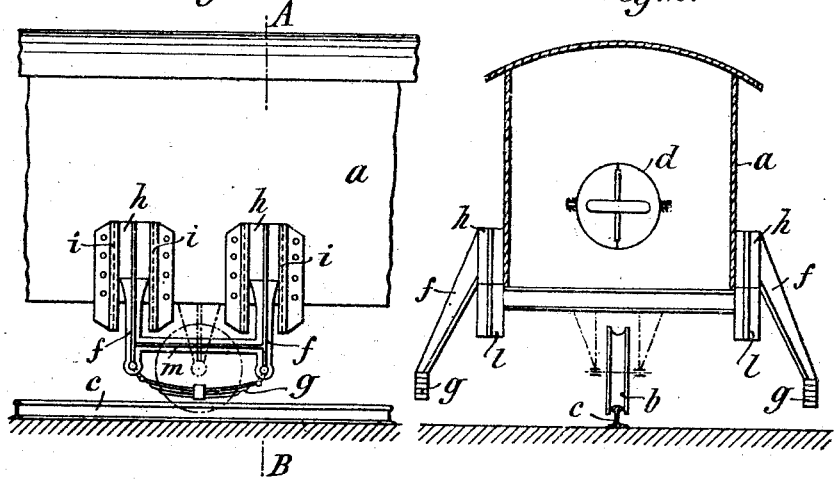

UNITED STATES PATENT OFFICE.

RICHARD SCHERL, OF BERLIN, GERMANY, ASSIGNOR TO SCHERL MONORAIL COMPANY, OF JERSEY CITY, NEW JERSEY, A CORPORATION OF NEW JERSEY.

SINGLE-TRACK VEHICLE.

959,077.   Specification of Letters Patent.   Patented May 24, 1910.

Application filed June 19, 1908. Serial No. 439,282.

*To all whom it may concern:*

Be it known that I, RICHARD SCHERL, gentleman, a subject of the Kingdom of Prussia, residing at Zimmerstrasse 37/41, Berlin, in the Kingdom of Prussia, German Empire, have invented certain new and useful Improvements in or Relating to Single-Track Vehicles, of which the following is a specification.

This invention relates to single track vehicles held in equilibrium by gyroscopes.

According to this invention, such vehicles are to be provided with a safety device in the shape of lateral supports which protect the vehicle from upsetting when, owing to the failure of the gyroscopes, it might be liable to turn over. To that end, supports adjustably mounted in lateral guides are connected according to this invention to the gyroscopes, or to one of the same, in such manner that during the normal working they are held raised, while in the event of the gyroscopes failing, they automatically sink to the ground in order to support the vehicle.

The invention can be carried out in various ways. The supports can be for instance held raised by a bolt connected to the gyroscopes and released on the latter failing, so that the supports could then sink into the position of use. If the gyroscopes are driven by electric motors, the withdrawal of the bolt can be preferably effected by means of electromagnets switched into the motor circuits. The release of the bolt takes place as soon as the strength of current falls below a certain value, that is to say, as soon as the speed of the gyroscopes falls to a certain value. In the position of use, the supports are simply retained by friction in their guide bearings, if they are arranged at such an angle that sufficient friction is produced when the vehicle comes to rest on them.

The invention is chiefly intended for the so-called mono-rail railways, that is to say, for vehicles traveling on one rail by means of two or more wheels arranged one behind another. The invention is, however, intended to be used also for vehicles which travel not on rails but on any desired track, for instance for single track motor cars.

Several constructions according to this invention, namely in application to a monorail vehicle, are illustrated by way of example in the accompanying drawing.

Figure 1 is a portion of a single track vehicle seen from the side, in which is used a construction of support with a spring blade sliding on the ground; Fig. 2 is a section on line A—B of Fig. 1; Fig. 3 is a special construction of the support shown in Figs. 1 and 2; Figs. 4 and 5 show another elastic support arrangement in front and side elevation, and Figs. 6 and 7 show the locking device for the slide block of the supports.

The single track vehicle $a$ travels with its wheels $b$ one of which is shown in Figs. 1 and 2 of the drawing, on the rail $c$ and is maintained in the position of equilibrium by a system of gyroscopes $d$ diagrammatically illustrated. When the gyroscopes, or one of them fail, the lateral supports must become operative in order to prevent the vehicle from turning over. These supports during the normal working are held raised, so that they cannot be in the way. To that end (see Figs. 1 and 2) there are provided two struts $f$ connected together by a horizontal spring blade $g$ and sliding in the guides $i$ secured to the vehicle by means of slide blocks $h$. The latter engage by means of projections $l$ with a groove $k$ of the guide $i$ (Fig. 7). The two struts $f$ are preferably rigidly secured together by means of a transverse member $m$, so that they can simultaneously move up and down. When the gyroscopes fail, the lateral supports automatically sink down and come to rest on the ground with the spring blade which slides on the ground if the vehicle continues to move and thus prevents it from turning over, and at the same time absorbs in an elastic manner all pressure or shocks.

During the normal working, the supports are preferably held raised by means of a bolt or the like. When the gyroscopes fail, the said bolts are withdrawn by means of a suitable device, whereupon the supports automatically slide down in the guide and come to rest on the ground. The release of the bolts can be for instance effected by a tension part or by a system of levers controlled by the rotating gyroscopes. If the gyroscopes are driven by electric motors it is preferable to use for the release of the bolt an electromagnetic device as shown for instance in Figs. 6 and 7. The bolt $n$ keeps raised the slide block $h$, to which is secured the strut $f$. A spring $o$ acting on the lever $p$ of the bolt, keeps the latter in its locked position. The said bolt $n$ is controlled by an electromagnet $q$ switched into the main circuit of the gyroscope motor and remaining idle as long as the speed of the gyroscope does not fall below a given value. If the latter happens, the electromagnet $q$ will be energized, and the bolt $n$ withdrawn in opposition to the action of the spring $o$, so that it releases the slide block $h$, and the support can sink. Obviously the electromagnet $q$ can be switched into the circuit of each gyroscope, so that on all or one of the gyroscopes failing, it at once becomes operative.

The support need not be secured after the sinking if it be arranged at such an angle relatively to the guides $i$, that the friction between the slide block and the guide, produced by the pressure of the ground on the support, is sufficient for holding fast the slide-block relatively to the guides. The slide block can, however, be locked also by a separate bolt $r$ controlled by a spring $s$. The said bolt springs into its locked position after the slide block $h$ has passed in front of it. In that way, it prevents the slide block from rising again. As the supports do not become operative in ordinary working, but only in exceptional cases, an automatic return of all the supports to the raised position is scarcely necessary. On the contrary, the supports can be raised again by hand or by a mechanism operated by hand, after turning the bolt $r$ back from the locking position.

Fig. 3 shows a special construction of the supports illustrated in Figs. 1 and 2. In this case only one slide block and only one guide are used. From the slide block start two struts $t$ in the shape of a fork and carry at their ends spring blades $u$. On the collar $v$ of the said spring blades can be mounted, as shown dotted in Fig. 3, one or two rollers $w$ so that the spring blade does not come into direct contact with the ground.

Figs. 4 and 5 show another construction in which the strut $f$ is provided with a hinged part $x$ on which is mounted a roller $y$ which, after the sinking of the support, comes into contact with the ground. The elastic yielding of the roller is insured by a separate spring $z$ engaging with a lever arm $x'$ secured to the hinged part $x$. The elastic yielding of the roller $y$ can of course be attained in some other manner, for instance, by making the support $f$ telescopic and connecting one telescopic part with the other by means of a helical spring arranged inside.

What I claim as my invention and desire to secure by Letters Patent is:—

1. The combination in a single track vehicle of a gyroscope, lateral guides on the vehicle, supports carried in said guides, means for raising the supports during normal working of the gyroscope and means for automatically lowering the supports so as to support the vehicle when the gyroscope is inoperative.

2. The combination in a single track vehicle of a gyroscope, lateral guides on the vehicle, supports carried in said guides, means for raising the supports during normal working of the gyroscope, a bolt to maintain the supports in the inoperative position and means connecting the bolt with the gyroscope whereby when the latter becomes inoperative the bolt is automatically moved and the supports are lowered.

3. The combination in a single track vehicle of a gyroscope, lateral guides on the vehicle, supports carried in said guides, means for raising the supports during normal working of the gyroscope a bolt to maintain the supports in inoperative position an electro-magnet to control the bolt an electric motor to drive the gyroscope and in circuit with the electro-magnet which automatically releases the bolt when the speed of the motor decreases to a given extent.

4. The combination in a single track vehicle of a gyroscope, lateral guides on the vehicle, supports in said guides and means for adjusting the supports in said guides at such an angle that they retain their position in the guides by friction without additional clamping means.

5. In a single track vehicle the combination of a gyroscope, an electric motor to drive said gyroscope, lateral guides on the vehicle, slidable supports in said guides a resilient member on said supports adapted to travel on suitable stationary members external to the car, a bolt to engage with the supports and maintain them in inoperative position, an electro-magnet in circuit with the electric-motor and controlling the said bolt, and means for automatically energizing the electro-magnet when the speed of the gyroscope falls below a given point whereby the bolt is moved and the supports dropped into operative position.

In witness whereof I have hereunto signed my name this 29th day of May 1908 in the presence of two subscribing witnesses.

RICHARD SCHERL.

Witnesses:
HENRY HASPER,
WOLDEMAR HAUPT.